US006206445B1

(12) United States Patent
Brooks

(10) Patent No.: US 6,206,445 B1
(45) Date of Patent: Mar. 27, 2001

(54) TAILGATE-ADAPTED CUTTING BOARD AND ACCESSORIES

(76) Inventor: Kenneth S. Brooks, 6939 Autumn Flowers, Katy, TX (US) 77449

( * ) Notice: Subject to any disclaimer, the term of this patent is extended or adjusted under 35 U.S.C. 154(b) by 0 days.

(21) Appl. No.: 09/426,154

(22) Filed: Oct. 22, 1999

(51) Int. Cl.[7] .................................................. B62D 25/00
(52) U.S. Cl. ......................... 296/51; 296/39.2; 296/57.1
(58) Field of Search ........................... 296/57.1, 50, 24.1

(56) References Cited

U.S. PATENT DOCUMENTS

| D. 381,564 | 7/1997 | Kolada . | |
|---|---|---|---|
| 2,721,777 | 10/1955 | Willis . | |
| 3,578,749 | * 5/1971 | Woten | 49/687 |
| 3,877,144 | * 4/1975 | LeBlanc | 30/124 |
| 4,002,387 | * 1/1977 | Wolbrink | 312/350 |
| 4,077,123 | * 3/1978 | Popeil et al. | 30/286 |
| 4,089,276 | 5/1978 | Enos . | |
| 4,161,335 | * 7/1979 | Nix et al. | 296/39 |
| 4,889,378 | * 12/1989 | Sims | 296/57.1 |
| 4,907,789 | * 3/1990 | Tics | 269/13 |
| 5,000,503 | * 3/1991 | Bernatek | 296/39.2 |
| 5,136,953 | 8/1992 | Schmidt . | |
| 5,169,201 | * 12/1992 | Gower | 296/39.2 |
| 5,169,202 | * 12/1992 | Cuoo et al. | 296/51 |
| 5,372,397 | * 12/1994 | Aradt | 296/39.2 |
| 5,386,978 | * 2/1995 | Ladwig | 269/289 |
| 5,533,771 | * 7/1996 | Tylor et al. | 296/26 |
| 5,649,734 | 7/1997 | Speis . | |
| 5,732,995 | 3/1998 | Piccariello . | |

FOREIGN PATENT DOCUMENTS 2 259 574 * 10/1975 (FR) .

* cited by examiner

Primary Examiner—Joseph D. Pape
Assistant Examiner—Kiran B. Patel

(57) ABSTRACT

A tailgate-adapted cutting board for conveniently and easily cleaning fish using the tailgate of a pickup truck. The tail-gate-adapted cutting board and accessories includes a board member having a dimension substantially that of a conventional tailgate of a pickup truck and further having a top side and a groove about the perimeter thereof, and also includes a knife storage container having a pair of longitudinal slots extending from a first end, and further having a cover at a second end and being securely mounted to the top side of the board member for storing knives and knife sharpening members, and further includes a clip member securely attached to the top side of the board member and a pair of bracket members each having a latch connecting member securely attached thereto for removeably latching to the tailgate, and also includes a paper dispensing unit.

11 Claims, 4 Drawing Sheets

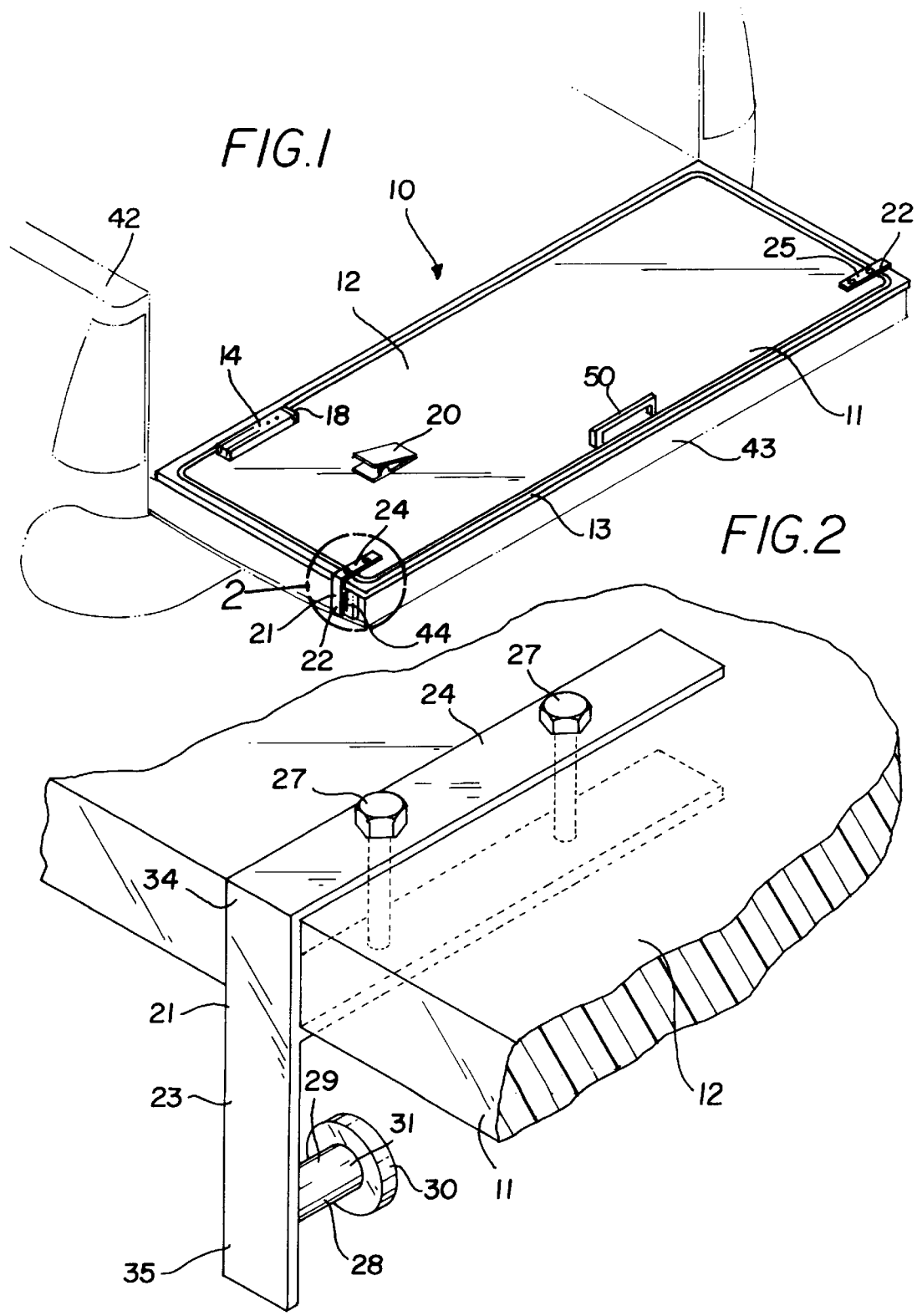

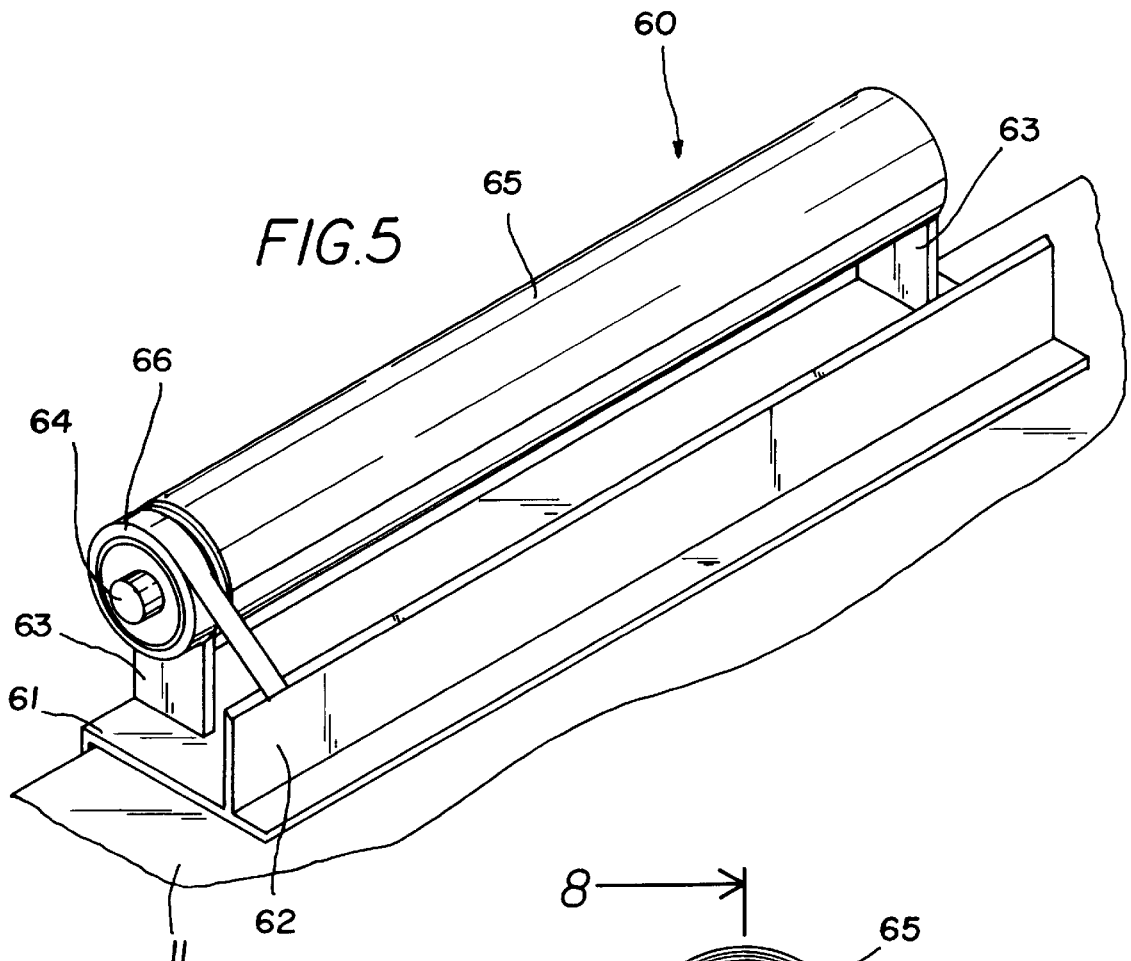
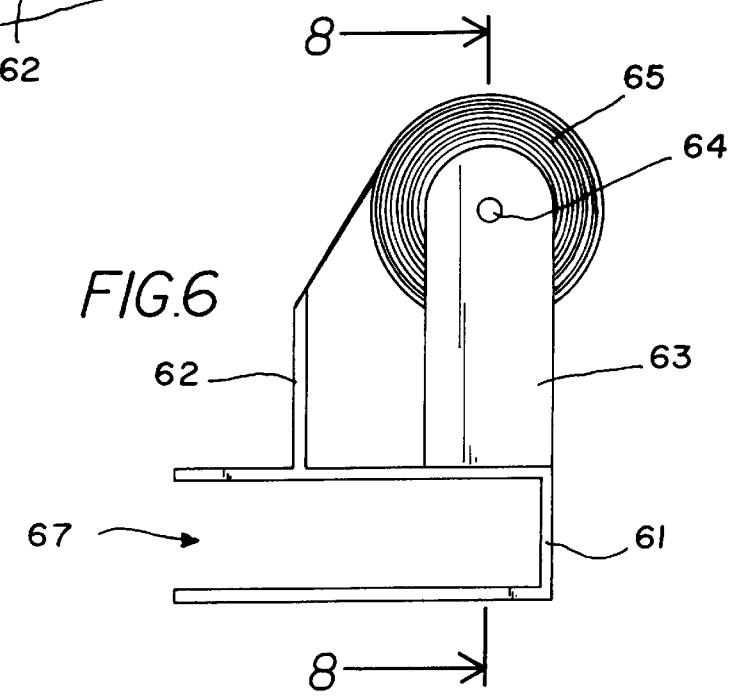

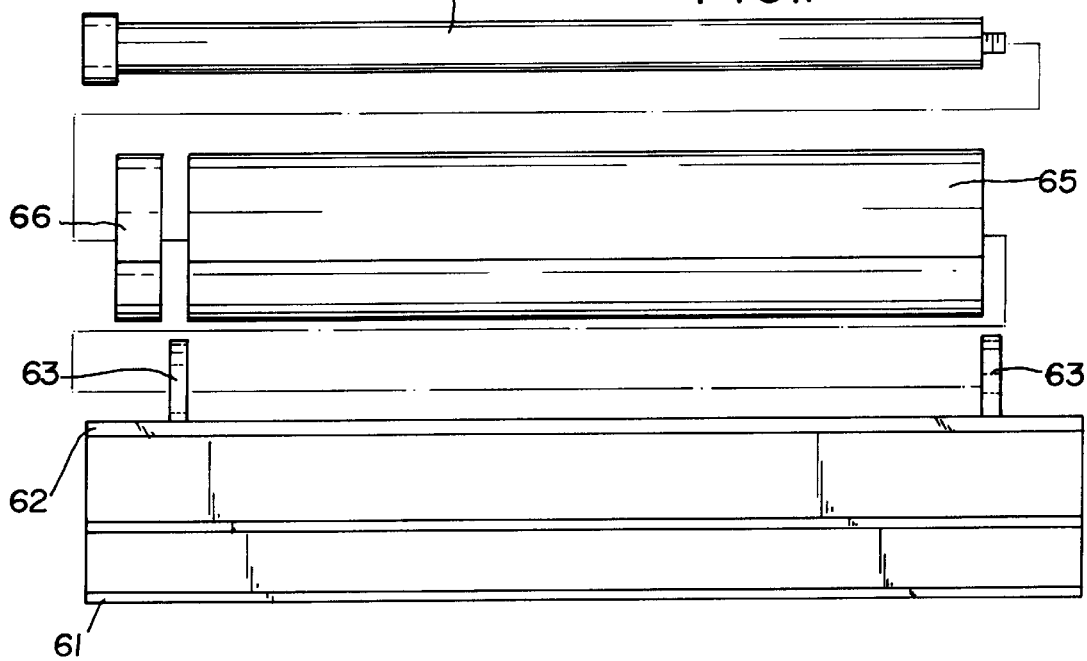
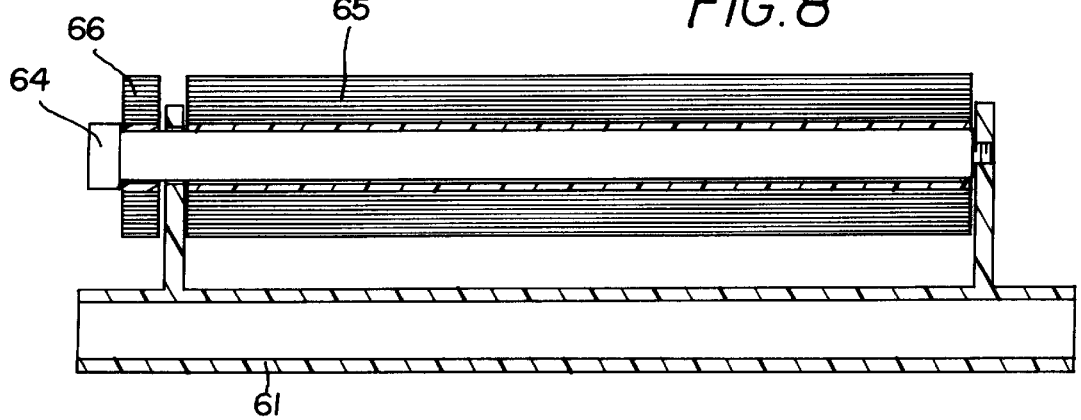

TAILGATE-ADAPTED CUTTING BOARD AND ACCESSORIES

BACKGROUND OF THE INVENTION

1. Field of the Invention

The present invention relates to a means for cleaning fish by using the tailgate of a pickup truck and more particularly pertains to a new tailgate-adapted cutting board and accessories for conveniently and easily cleaning fish using the tailgate of a pickup truck.

2. Description of the Prior Art

The use of a means for cleaning fish by using the tailgate of a pickup truck is known in the prior art. More specifically, a means for cleaning fish by using the tailgate of a pickup truck heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,089,276; U.S. Pat. No. 5,649,734; U.S. Pat. No. 5,136,953; U.S. Pat. No. 5,732,995; U.S. Pat. No. Des. 381,564; and U.S. Pat. No. 2,721,777.

While these devices fulfill their respective, particular objectives and requirements, the aforementioned patents do not disclose a new tailgate-adapted cutting board and accessories. The inventive device includes a board member having a dimension substantially that of a conventional tailgate of a pickup truck and further having a top side and a groove about the perimeter thereof, and also includes a knife storage container having a pair of longitudinal slots extending from a first end, and further having a cover at a second end and being securely mounted to the top side of the board member for storing knives and knife sharpening members, and further includes a clip member securely attached to the top side of the board member and a pair of bracket members each having a latch connecting member securely attached thereto for removeably latching to the tailgate In these respects, the tailgate-adapted cutting board according to the present invention substantially departs from the conventional concepts and designs of the prior art, and in so doing provides an apparatus primarily developed for the purpose of conveniently and easily cleaning fish using the tailgate of a pickup truck.

SUMMARY OF THE INVENTION

In view of the foregoing disadvantages inherent in the known types of a means for cleaning fish by using the tailgate of a pickup truck now present in the prior art, the present invention provides a new tailgate-adapted cutting board construction wherein the same can be utilized for conveniently and easily cleaning fish using the tailgate of a pickup truck.

The general purpose of the present invention, which will be described subsequently in greater detail, is to provide a new tailgate-adapted cutting board and accessories which has many of the advantages of the a means for cleaning fish by using the tailgate of a pickup truck mentioned heretofore and many novel features that result in a new tailgate-adapted cutting board which is not anticipated, rendered obvious, suggested, or even implied by any of the prior art a means for cleaning fish by using the tailgate of a pickup truck, either alone or in any combination thereof.

To attain this, the present invention generally comprises a board member having a dimension substantially that of a conventional tailgate of a pickup truck and further having a top side and a groove about the perimeter thereof, and also includes a knife storage container having a pair of longitudinal slots extending from a first end, and further having a cover at a second end and being securely mounted to the top side of the board member for storing knives and knife sharpening members, and further includes a clip member securely attached to the top side of the board member and a pair of bracket members each having a latch connecting member securely attached thereto for removeably latching to the tailgate and also having a paper dispensing unit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tailgate-adapted cutting board and accessories which has many of the advantages of the a means for cleaning fish by using the tailgate of a pickup truck mentioned heretofore and many novel features that result in a new tailgate-adapted cutting board which is not anticipated, rendered obvious, suggested, or even implied by any of the prior art a means for cleaning fish by using the tailgate of a pickup truck, either alone or in any combination thereof.

It is another object of the present invention to provide a new tailgate-adapted cutting board and accessories which may be easily and efficiently manufactured and marketed.

It is a further object of the present invention to provide a new tailgate-adapted cutting board and accessories which is of a durable and reliable construction.

An even further object of the present invention is to provide a new tailgate-adapted cutting board and accessories which is susceptible of a low cost of manufacture with regard to both materials and labor, and which accordingly is then susceptible of low prices of sale to the consuming public, thereby making such tailgate-adapted cutting board and accessories economically available to the buying public.

Still yet another object of the present invention is to provide a new tailgate-adapted cutting board and accessories which provides in the apparatuses and methods of the prior art some of the advantages thereof, while simultaneously overcoming some of the disadvantages normally associated therewith.

Still another object of the present invention is to provide a new tailgate-adapted cutting board and accessories for conveniently and easily cleaning fish using the tailgate of a pickup truck.

Yet another object of the present invention is to provide a new tailgate-adapted cutting board and accessories which includes a board member having a dimension substantially that of a conventional tailgate of a pickup truck and further having a top side and a groove about the perimeter thereof, and also includes a knife storage container having a pair of longitudinal slots extending from a first end, and further having a cover at a second end and being securely mounted to the top side of the board member for storing knives and knife sharpening members, and further includes a clip member securely attached to the top side of the board member and a pair of bracket members each having a latch connecting member securely attached thereto for removeably latching to the tailgate.

Still yet another object of the present invention is to provide a new tailgate-adapted cutting board and accessories that allows the user to clean fish easily and conveniently onsite.

Even still another object of the present invention is to provide a new tailgate-adapted cutting board and accessories that can be easily and conveniently set up quickly without needing a separate stand or base.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new tailgate-adapted cutting board and accessories according to the present invention.

FIG. 2 is a detailed view of one of the bracket members of the present invention.

FIG. 5 is a perspective view of the paper dispensing unit of the present invention.

FIG. 6 is a side elevational view of the paper dispensing unit of the present invention.

FIG. 7 is an exploded view of the paper dispensing unit of the present invention.

FIG. 8 is a front elevational view of the paper dispensing unit of the present invention.

DESCRIPTION OF THE PREFERRED EMBODIMENT

Figure 3:
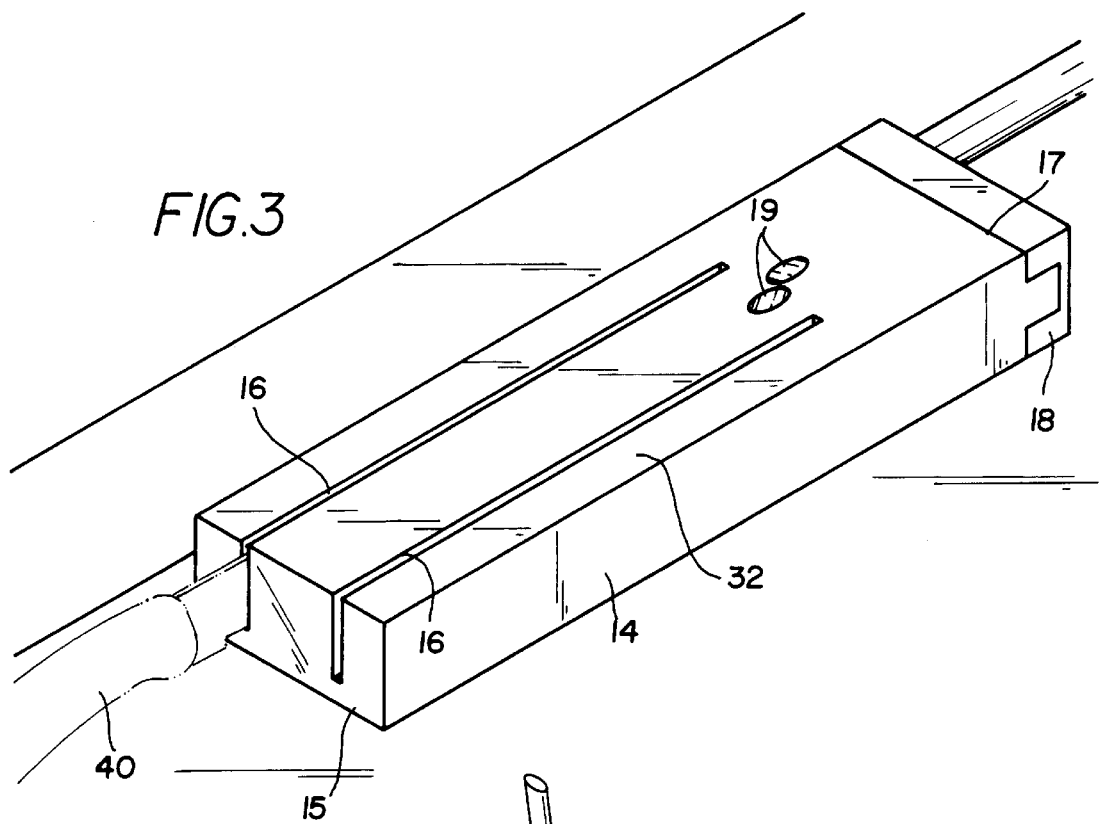
FIG. 3 is a detailed view of storage container of the present invention.
Figure 4:
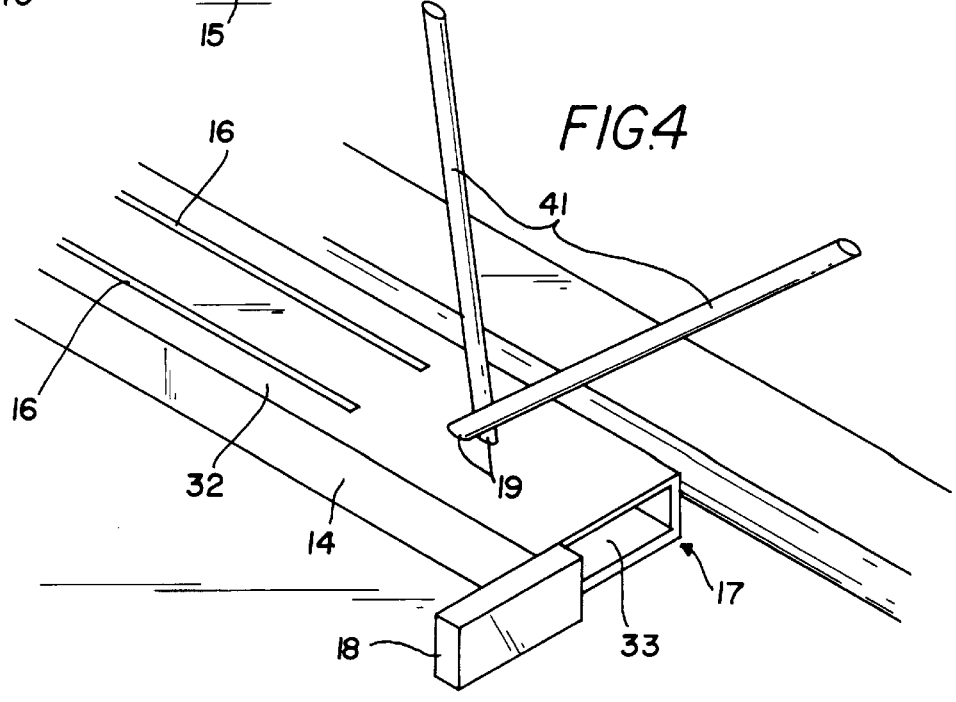
FIG. 4 is a detailed view of the storage container and knife sharpening members of the present invention.

With reference now to the drawings, and in particular to FIGS. 1 through 8 thereof, a new tailgate-adapted cutting board and accessories embodying the principles and concepts of the present invention and generally designated by the reference numeral 10 will be described.

As best illustrated in FIGS. 1 through 8, the tailgate-adapted cutting board 10 generally comprises a board member 11 having a dimension adapted to that of a tailgate 43 of a truck 42 and having a top side 12 and an endless groove 13 extending along and in a perimeter of the top side 12 for receiving fluid from the game as it is being cleaned and also having a handle member 50 securely and conventionally attached to near an end of the board member 11. A storage container 14 having a first end 15, a second end 17 and a cover 18 removeably secured over the second end 17 for storing knives 40 and knife sharpening members 41 is securely and conventionally attached to the top side 12 of the board member 11. The storage container 14 includes a top wall 32 having a plurality of longitudinal slots 16 extending from the first end 15 and along a portion of the top wall 32, each of the slots 16 being adapted to receive a respective knife 40. The storage container 14 further includes an inside compartment 33 adapted to receive and store knife sharpening members 41 through the second end 17. The storage container 14 also includes a plurality of holes 19 in the top wall 32 thereof, the holes 19 being adapted to receive knife sharpening members 41. A clip member 20 is securely mounted to the top side 12 of the board member 11 for holding game being cleaned. A freezer paper dispenser unit 60 is removably mounted about an end of the board member 11 and includes a base member 61 essentially being C-shaped and having an opening 67 adapted to receive an end portion of the board member 11, a pair of bracket members 63 extending upwardly from and being integrally connected to the base member 61 and further includes a spindle 64 rotatably mounted to the bracket members 63 and adapted to hold a roll of freezer paper 65. The spindle 64 is also adapted to retain a spool of tape 66 which is removeably mounted on one end of the spindle 64, the tape being used to secure the freezer paper 65 about the cleaned game. An elongate cutting member 62 also extends upwardly from and is integral to the base member 61 for cutting a selected amount of freezer paper being unwrapped from the roll of freezer paper 65. A means for removeably securing the board member 11 to a tailgate 43 includes a plurality of bracket members 21,22 each having a first elongate portion 23 and a second elongate portion 24,25 being integrally perpendicular to the first elongate portion 23 at a top end 34 thereof. Each of the bracket members 21,22 further includes a third elongate portion 26 which is integrally perpendicular to the first elongate portion 23 and is spaced from and parallel to the second elongate portion 24. Each of the bracket members 21,22 also includes fastening members 27 which extend through the board member 11 interconnecting the second 24 and the third 26 elongate portions. Each of the bracket members 21,22 further includes a latch-connecting member 28 securely attached to and extending from the first elongate portion 23 near a bottom end 35 thereof. Each latch-connecting member 28 includes an elongate member 29 having a first end securely attached to the first elongate portion 23, and further including a disk-shaped knob 30 at a second end 31 thereof, the disk-shaped knob 30 being adapted to be lockably received in a latching means 44 of a tailgate 43 to secure the board member 11.

In use, the user lowers the tailgate 43 and positions the board member 11 upon the tailgate 43 with the latch-connecting member 28 being lockably received in the latching means 44 of the tailgate 43 to secure the board member 11 upon the tailgate 43. The user can then secure the game which may be a fish to the clip member 20 and use the knives 40 stored in the storage container 14 to clean the fish.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tailgate-adapted cutting board and accessories comprising:
    a board member having a dimension adapted to that of a tailgate of a truck and having a top side and an endless groove extending along a perimeter of said top side for receiving fluids from a game as it is being cleaned, and further having a handle member securely attached near an end of said board member for the lifting thereof;
    a storage container having a first end, a second end and a cover removeably secured over said second end being securely attached to said top side, for storing knives and knife sharpening members;
    a clip member securely mounted to said top side of said board member for holding game being cleaned;
    a means for removeably securing said board member to the tailgate; and
    a paper dispensing unit removably mounted about said board member.

2. A tailgate-adapted cutting board and accessories as described in claim 1, wherein said storage container includes a top wall having a plurality of longitudinal slots extending from said first end and along a portion of said top wall, each of said slots being adapted to receive a respective knife.

3. A tailgate-adapted cutting board and accessories as described in claim 2, wherein said storage container includes an inside compartment adapted to receive and store knife sharpening members through said second end.

4. A tailgate-adapted cutting board and accessories as described in claim 3, wherein said storage container includes a plurality of holes in said top wall thereof, said holes being adapted to receive knife sharpening members.

5. A tailgate-adapted cutting board and accessories as described in claim 1, wherein said means for removeably securing said board member to a tailgate includes a plurality of bracket members each having a first elongate portion and a second elongate portion being integrally perpendicular to said first elongate portion at a top end thereof.

6. A tailgate-adapted cutting board and accessories as described in claim 5, wherein each of said bracket members further includes a third elongate portion which is integrally perpendicular to said first elongate portion and is spaced from and parallel to said second elongate portion.

7. A tailgate-adapted cutting board and accessories as described in claim 6, wherein each of said bracket members also includes fastening members which extend through said board member interconnecting said first and said third elongate portions.

8. A tailgate-adapted cutting board and accessories as described in claim 7, wherein each of said bracket members further includes a latch-connecting member securely attached to and extending from said first elongate portion near a bottom end thereof.

9. A tailgate-adapted cutting board and accessories as described in claim 8, wherein each said latch-connecting member includes an elongate member having a first end securely attached to said first elongate portion, and further includes a disk-shaped knob at a second end thereof, said disk-shaped knob being adapted to be lockably received in a latching means of a tailgate to secure said board member.

10. A tailgate-adapted cutting board and accessories as described in claim 1, wherein said paper dispensing unit includes a base member adapted to removably mount about an end portion of said board member; bracket members integrally extending upwardly from said base member; an elongate cutting member extending upwardly from said base member; a spindle for holding a roll of freezer paper and being removably mounted to said bracket members; and a spool of tape removably mounted to said spindle.

11. A tailgate-adapted cutting board and accessories comprising: a board member having a dimension adapted to that of a tailgate of a truck and having a top side and an endless groove extending along a perimeter of said top side for receiving fluid from the game as it is being cleaned, and also having a handle member securely attached near an end of said board member for the lifting thereof;
    a storage container having a first end, a second end and a cover removeably secured over said second end and being securely attached to said top side, for storing knives and knife sharpening members, said storage container including a top wall having a plurality of longitudinal slots extending from said first end and along a portion of said top wall, each of said slots being adapted to receive a respective knife, said storage container further including an inside compartment adapted to receive and store knife sharpening members through said second end, said storage container also including a plurality of holes in said top wall thereof, said holes being adapted to receive knife sharpening members;
    a clip member securely mounted to said top side of said board member for holding game being cleaned;
    a means for removeably securing said board member to a tailgate including a plurality of bracket members each having a first elongate portion and a second elongate portion being integrally perpendicular to said first elongate portion at atop end thereof, each of said bracket members further including a third elongate portion which is integrally perpendicular to said first elongate portion and is spaced from and parallel to said second elongate portion, each of said bracket member also including fastening members which extend though said board member interconnecting said first and said third elongate portions, each of said bracket member further including a latch-connecting member securely attached to and extending from said first elongate portion near a bottom end thereof, each said latch-connecting member including an elongate member having a first end securely attached to said first elongate portion, and further including a disk-shaped knob at a second end thereof, said disk-shaped knob being adapted to be lockably received in a latching means of a tailgate to secure said board member; and a paper dispensing unit which includes a base member adapted to removably mount about an end portion of said board member; bracket members integrally extending upwardly from said base member; an elongate cutting member extending upwardly from said base member; a spindle for holding a roll of freezing paper and being removably mounted to said bracket members; and a spool of tape removably mounted to said spindle.

\* \* \* \* \*